(12) United States Patent
Nakamura et al.

(10) Patent No.: US 7,478,206 B2
(45) Date of Patent: Jan. 13, 2009

(54) INFORMATION-PROCESSOR FOR CONTROLLING A STORING AREA IN ACCORDANCE WITH AN AMOUNT OF REQUESTED INFORMATION

(75) Inventors: Harumi Nakamura, Tokorozawa (JP);
Koji Matsuura, Tokorozawa (JP);
Naoaki Horiuchi, Tsurugashima (JP);
Tomoharu Kirihara, Tokorozawa (JP);
Hideki Nagata, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 574 days.

(21) Appl. No.: 11/142,660

(22) Filed: Jun. 2, 2005

(65) Prior Publication Data
US 2005/0289635 A1    Dec. 29, 2005

(30) Foreign Application Priority Data
Jun. 2, 2004    (JP) .............................. 2004-164933

(51) Int. Cl.
*G06F 12/00* (2006.01)
(52) U.S. Cl. .................... 711/154; 711/170; 711/173
(58) Field of Classification Search ............. 725/131, 725/134, 139, 89; 711/154, 170, 173
See application file for complete search history.

(56) References Cited

U.S. PATENT DOCUMENTS 6,311,011 B1 * 10/2001 Kuroda ................... 386/46
6,766,426 B1 * 7/2004 Sugiyama ................. 711/154
2005/0289595 A1 * 12/2005 Nakamura et al. ........... 725/45
2005/0289599 A1 * 12/2005 Matsuura et al. ............ 725/53
2005/0289600 A1 * 12/2005 Kawahara et al. ........... 725/53
2005/0289616 A1 * 12/2005 Horiuchi et al. ............ 725/89
2006/0098946 A1 * 5/2006 Park ........................ 386/98

FOREIGN PATENT DOCUMENTS

| JP | 10-271443 | 10/1998 |
| JP | 11-66694 | 3/1999 |
| JP | 2003153162 A * | 5/2003 |

* cited by examiner

*Primary Examiner*—Hong Kim
(74) *Attorney, Agent, or Firm*—Kratz, Quintos & Hanson, LLP

(57) ABSTRACT

A storing/reproducing device includes a storing controller that recognizes programming information read out from timer recording list information and the data size of a content corresponding to the programming information, and compares the data size with free spaces of an automatic recording area 272 and a manual recording area 273 both forming a content recording area 271, the free spaces being recognized by a storing area manager. When the content is recorded based on the programming information set with input operation by a user, the storing controller records the content in the automatic recording area 272 if the storing controller judges that there is not enough free space in the manual recording area 273. Accordingly, other pieces of information will not be recorded in the manual recording area 273, thereby securing free space in the manual recording area. Therefore, manual recording with the input operation by the user can surely be performed.

25 Claims, 6 Drawing Sheets

INFORMATION-PROCESSOR FOR CONTROLLING A STORING AREA IN ACCORDANCE WITH AN AMOUNT OF REQUESTED INFORMATION

BACKGROUND OF THE INVENTION

1. Field of the Invention

The present invention relates to an information processor for controlling a storing unit to store information, a method thereof, a program thereof, a recording medium storing the program and an information storage.

2. Description of Related Art

Conventionally, as for an information storage for recording a broadcasting program, there has been known a device that automatically programs timer recording for a program being desired based on a preset keyword without user's manual input. As such device, there is an information storage that erases stored information when a storing area of a recording medium almost becomes full (for example, see Document 1: JP11-066694A). The device disclosed in the Document 1, when the storing area of the recording medium to store a broadcasting program almost becomes full, searches and automatically erases the stored information that has been once reproduced or low-priority in order to secure the sufficient storing area.

However, in the configuration disclosed in the Document 1, even the broadcasting program with user's preference may be erased. Further, when the storing area almost becomes full, if the user tries to store the broadcasting program therein, the user may not store the broadcasting program desired by the user because the storing area is not sufficiently be secured by automatically erasing the data.

SUMMARY OF THE INVENTION

An object of the present invention is to provide an information processor for appropriately storing information, a method thereof, a program thereof, a recording medium storing the program and an information storage.

An information processor according to an aspect of the present invention that, based on detail information related to a detail of information, controls an information retriever to retrieve the information of a predefined detail and a stores unit to store the information, includes: a request information recognizer that recognizes request information so that the information retriever retrieves the information corresponding to a specified detail and the information related to the predefined detail and the stores unit stores the information; a stores area partitioning that forms a specified information stores area in which a plurality of the information corresponding to the specified detail can be stored and a related information stores area in which a plurality of the information related to the predefined detail can be stored in the stores unit; an information amount recognizer that recognizes an amount of the information being requested based on the detail information corresponding to the information being requested recognized from the request information with the request information recognizer; a free space recognizer that recognizes a free space of the specified information stores area and the related information stores area; a judging section that compares the amount of the information being requested with the free space and judges whether or not the information being requested can be stored; and a stores controller that controls the information retriever to retrieve the information being requested based on the detail information and store the information in the related information stores area when the judging section recognizes that the information cannot be stored in a case that the information being requested is the information corresponding to the specified detail, and restricts the information retriever to retrieve the information being requested when the judging section recognizes that the information cannot be stored in a case that the information being requested is the information related to the predefined detail.

An information processor according to another aspect of the present invention that, based on detail information related to a detail of information, controls an information retriever to retrieve the information of a predefined detail and a stores unit to store the information, includes: a request information recognizer that recognizes request information so that the information retriever retrieves the information corresponding to a specified detail and the information related to the predefined detail and the stores unit stores the information; a stores area partitioning that forms a specified information stores area in which a plurality of the information corresponding to the specified detail can be stored and a related information stores area in which a plurality of the information related to the predefined detail can be stored in the stores unit; an information amount recognizer that recognizes an amount of the information being requested based on the detail information corresponding to the information being requested recognized from the request information with the request information recognizer; a free space recognizer that recognizes a free space of the specified information stores area and the related information stores area; a judging section that compares the amount of the information being requested with the free space and judges whether or not the information being requested can be stored; and a stores controller that, when the judging section judges that the information cannot be stored in a case that the information being requested is the information corresponding to the specified detail, increases the specified information stores area formed by the stores area partitioning so that at least the information being requested can be stored, when the judging section judges that the information cannot be stored in a case that the information being requested is the information related to the predefined detail, increases the related information stores area while a free space of the specified information stores area formed by the stores area partitioning is kept equal to or greater than a predetermined amount, and then controls stores of the information.

An information storage according to still another aspect of the present invention includes the above-described information processor; an information retriever that retrieves the information; and a storing unit that stores the retrieved information.

An information processing method according to yet another aspect of the present invention for stores information in a stores unit with a computing unit, the method executed by the computing unit includes the steps of: recognizing request information to retrieve the information corresponding to a specified detail and the information related to the predefined detail and store the information with the stores unit; recognizing an amount of the information being requested based on the detail information corresponding to the information being requested recognized from the request information; recognizing free spaces of a specified information stores area in which a plurality of the information corresponding to the specified detail can be stored and a related information stores area in which a plurality of the information related to the predefined detail can be stored, the specified information stores area and the related information stores area being formed in the stores unit; comparing the recognized amount of the information being requested with the free space and judging whether or not the information being requested can be stored; and retrieving the information being requested based on the detail information and stores the information in the related information stores area when recognizing that the information cannot be stored in the specified information stores area in a case that the information being requested is the information corresponding to the specified detail, and restricting retrieving of the information being requested when recognizing that the information cannot be stored in the related information stores area in a case that the information being requested is the information related to the predefined detail.

An information processing method according to a further aspect of the present invention for stores information in a stores unit with a computing unit, the method executed by the computing unit includes the steps of: recognizing request information to retrieve the information corresponding to a specified detail and the information related to the predefined detail and store the information with the stores unit; recognizing an amount of the information being requested based on the detail information corresponding to the information being requested recognized from the request information; recognizing free spaces of a specified information stores area in which a plurality of the information corresponding to the specified detail can be stored and a related information stores area in which a plurality of the information related to the predefined detail can be stored, the specified information stores area and the related information stores area being formed in the stores unit; comparing the recognized amount of the information being requested with the free space and judging whether or not the information being requested can be stored; and when judging that the information cannot be stored in the specified information stores area in a case that the information being requested is the information corresponding to the specified detail, increasing the specified information stores area so that at least the information being requested can be stored, when judging that the information cannot be stored in the related information stores area in a case that the information being requested is the information related to the predefined detail, increasing the related information stores area while a free space of the specified information stores area is kept equal to or greater than a predetermined amount, and then controlling stores of the information.

An information processing program according to a still further aspect of the present invention controls a computing unit so that the computing unit functions as the above-described information processor.

An information processing program according to a yet further aspect of the present invention controls a computing unit to execute the above-described information processing method.

A recording medium according to a yet further aspect of the present invention stores the above-described information processing program in a manner readable by a computing unit.

DETAILED DESCRIPTION OF PREFERRED EMBODIMENT(S)

An embodiment of the present invention will be described below with attached drawings. In the present embodiment, a storing/reproducing device including a data processor having a processing controller of the present invention is described as an example, however, it is not limited thereto, and any configuration that erases data stored in a storing unit can be applied. In the present embodiment, a processing that stores content data will also be expressed as a processing that records a content. And, manual recording programming request information is retrieved as specified data storing request information in which recording start date and time, recording end date and time, a channel and the like input by a user are contained. A processing that programs timer recording of a specified content specified with each setting in the manual recording programming request information will also be expressed as a processing for manual recording programming. A processing for recording with manual recording programming will also be expressed as a processing for manual timer recording. Further, automatic recording programming request information including a keyword as text information input by the user is retrieved. In the present embodiment, the description is related to a processing that retrieves content data (information) of a TV broadcasting program according to, for instance, the Electric Program Guide called EPG which is program information (guide information) of a broadcasting program, however, it is not limited thereto. A content may be a broadcasting content such as a radio broadcasting program or a satellite broadcasting program, a broadcasting content such as music or video, a privately created sharable content such as various programs of game software, and any configuration may be applied for retrieving the information based on titles of the respective information or guide information related to a guide containing details. A processing for recording with automatic recording programming will also be expressed as a processing for automatic timer recording.

[Configuration of Content Storing/Reproducing System]

Figure 1:
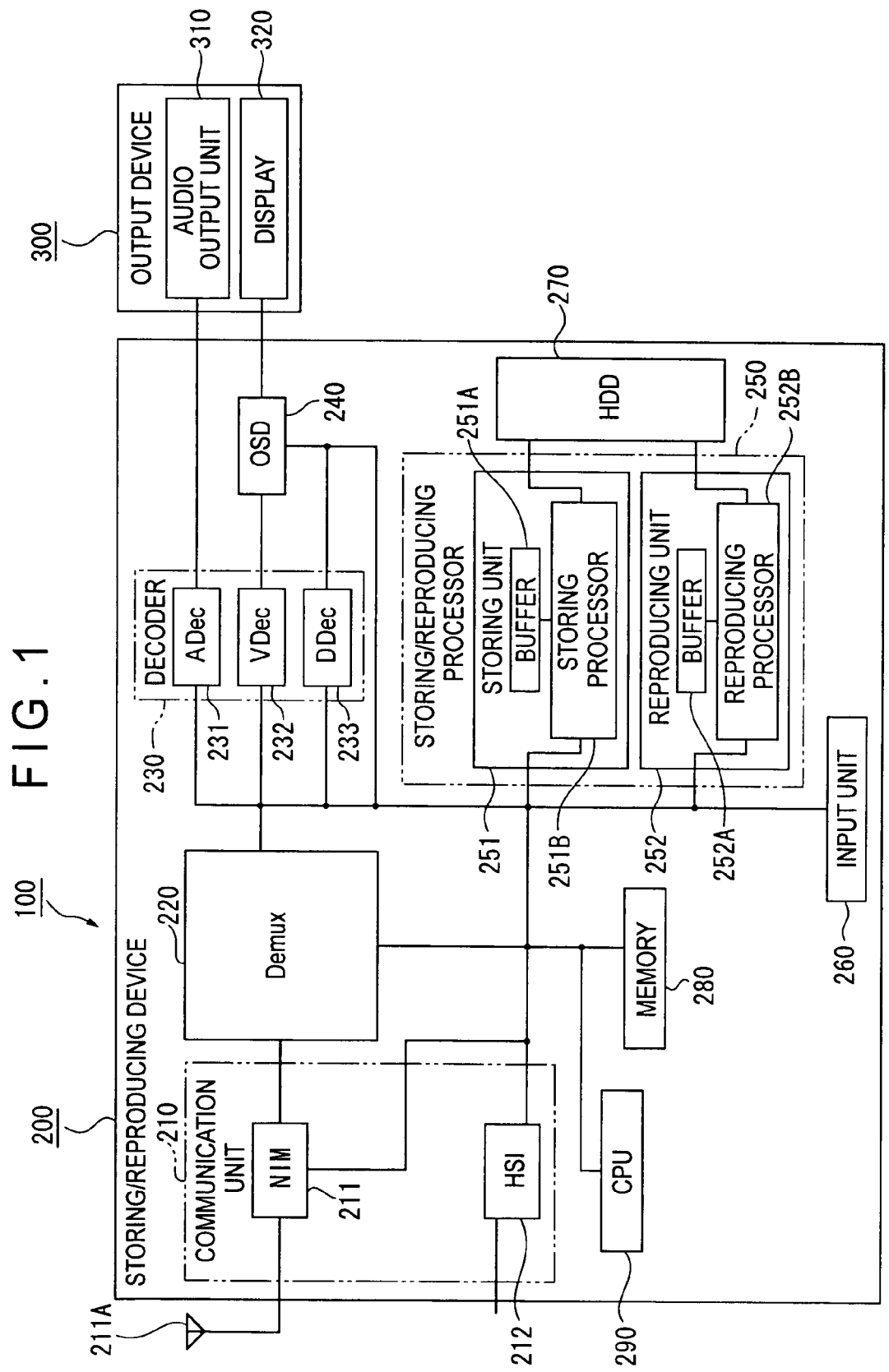
FIG. 1 is a block diagram showing the brief configuration of a content storing/reproducing system according to a present embodiment.

In FIG. 1, the reference numeral 100 indicates a content storing/reproducing system (hereinafter referred to a storing/reproducing system) for storing a content data including audio data, video data, data-broadcasting data of a content such as a TV program, and for reproducing the stored content data. The storing/reproducing system 100 includes a storing/reproducing device 200 (an information processor and an information storage) and an output device 300.

The output device 300 may be a personal computer, a TV set, a portable phone or a PDA (Personal Digital Assistant). The output device 300 receives the content input from the storing/reproducing device 200 and outputs the content. The output device 300 has an audio output unit 310, a display 320 and the like.

The audio output unit 310 is provided with a sound-producing unit such as a speaker (not shown). The audio output unit 310 outputs the audio data transmitted as analog signals from the storing/reproducing device 200 via the sound-producing unit as sounds. Incidentally, the sound-producing unit can also output other data such as TV audio data received with a TV receiver (not shown).

The display 320 displays the video data, the broadcasting data, the EPG data, synthesized data and the like transmitted as analog signals or digital signals from the storing/reproducing device 200. The video data to be displayed may be a video picture of the content. The broadcasting data may be a caption of the content and a data broadcasting. The EPG data may be a program list in which a title, detail, broadcasting start date and time and the like of the content to be broadcasted on each channel are listed. The synthesized data may be a synthesized picture in which the caption is superposed on the video picture of the content and a video picture in which the data broadcasting and the program list are arranged side by side. The display 320 may be a liquid crystal display panel, an organic EL (Electro Luminescence) panel, a PDP (Plasma Display Panel), a CRT (Cathode-Ray Tube), an FED (Field Emission Display) and an electrophoretic display panel. Incidentally, the display 320 can also output other data such as TV video data received with the TV receiver.

The storing/reproducing device 200 retrieves and stores the content data including the audio data, the video data, the data-broadcasting data and the like that are distributed as a TS (Transport Stream) and outputs the content data by the output device 300. The storing/reproducing device 200 also reproduces the stored content data and outputs the content data from the output device 300. In addition, the storing/reproducing device 200 automatically erases the stored content data. The storing/reproducing device 200 includes a communication unit 210, a demultiplexer (Demux) 220, a decoder 230, an on screen display (OSD) 240, a storing/reproducing processor 250, an input unit 260, a hard disk drive (HDD) 270 as a storing unit, a memory 280, a CPU (Central Processing Unit) 290 as a computing unit and the like.

The communication unit 210 retrieves the content data input from outside and outputs the content data outward. And the communication unit 210 has a network interface module (NIM) 211, a high-speed interface (HSI) 212 and the like.

Connected to the NIM 211 is an antenna 211A for receiving broadcasting waves such as terrestrial digital broadcasting or satellite digital broadcasting. The NIM 211 is also connected with the Demux 220, the CPU 290 and the like. Under the control of the CPU 290, the NIM 211 retrieves the TS corresponding to the content selected by the user from the plurality of TSs transmitted as digital signals from the antenna 211A. The NIM 211 outputs the retrieved TS to the Demux 220.

The HSI 212 is an interface capable of high-speed data processing such as the IEEE (Institute of Electrical and Electronic Engineers) 1394 standard or an interface for internet connection. Connected to the HSI 212 are the Demux 220, the storing/reproducing processor 250 and the like. The HSI 212 retrieves the TS and a partial TS (described below) transmitted as digital signals from an external device (not shown) provided outside the storing/reproducing device 200 and outputs the TS and the partial TS to the Demux 220. The HSI 212 also retrieves the partial TS output by the storing/reproducing processor 250 and performs a necessary processing to transmit the partial TS as digital signals to the external device (not shown) provided outside the storing/reproducing device 200.

The Demux 220 retrieves the TS and separates a TS packet from the TS to output the TS packet. Connected to the Demux 220 are the decoder 230, the storing/reproducing processor 250, the CPU 290 and the like. The Demux 220 retrieves the TS from the NIM 211 and HSI 212 under the control of the CPU 290. The Demux 220 further retrieves the TS packet of various data corresponding to the selected content from the TS. Specifically, the Demux 220 retrieves a TS packet in which the audio data is embedded (hereinafter referred to as an audio packet), a TS packet in which the video data is embedded (hereinafter referred to as a video packet) and a TS packet in which the data-broadcasting data, the EPG data and the like are embedded (hereinafter referred to as a data packet). The Demux 220 outputs the retrieved audio packet, video packet and data packet to the decoder 230.

Here, the EPG data is data in which information about the content of each TS such as a TV program retrievable with the NIM 211 is described in a text format such as BML (Broadcast Markup Language) and XML (extensible Markup Language). In concrete, the EPG data is data having a table structure in which a title, a description of detail and the like, broadcasting start date and time, a broadcasting time length, a channel number, a category, a series name etc. of a program constitute one data unit.

When the Demux 220 retrieves each TS packet corresponding to the selected content from the retrieved TS under the control of the CPU 290, the Demux 220 restructures the TS packet into the TS having the above-described data structure, i.e. into the partial TS. The Demux 220 then outputs the partial TS to the storing/reproducing processor 250. The Demux 220 also retrieves the partial TS from the HSI 212 and the storing/reproducing processor 250 under the control of the CPU 290. And the Demux 220 divides the retrieved partial TS into the audio packet, the video packet and the data packet to output the packets to the decoder 230.

The decoder 230 is connected to the OSD 240, the CPU 290, the output device 300 and the like. The decoder 230 retrieves each packet from the Demux 220 and outputs the various data embedded in each packet to the OSD 240 and the output device 300. The decoder 230 includes an audio decoder (ADec) 231, a video decoder (VDec) 232 and a data decoder (DDec) 233.

The ADec 231 is connected to the audio output unit 310 of the output device 300. The ADec 231 retrieves the audio packet from the Demux 220 under the control of the CPU 290. The ADec 231 demodulates the audio data embedded in the audio packet and transmits as analog signals to the audio output unit 310 of the output device 300.

The VDec 232 is connected to the OSD 240. The VDec 232 retrieves the video packet from the Demux 220 under the control of the CPU 290. The VDec 232 demodulates the video data embedded in the video packet and outputs the data to the OSD 240.

The DDec 233 is connected to the OSD 240. The DDec 233 retrieves the data packet from the Demux 220 under the control of the CPU 290. The DDec 233 demodulates the data-broadcasting data, the EPG data and the like embedded in the data packet and outputs the data to the OSD 240. When the EPG data is embedded in the data packet, the DDec 233 also outputs the EPG data to the memory 280 under the control of the CPU 290.

The OSD 240 is connected to the CPU 290, the display 320 of the output device 300 and the like. The OSD 240 retrieves the video data from the VDec 232 under the control of the CPU 290. The OSD 240 also retrieves the data-broadcasting data, the EPG data and the like from the DDec 233. Then, the OSD 240 generates the synthesized data to display the video picture of the video data, the caption (for an example) of the data-broadcasting data and the program list (for an example) of the EPG data in a selectively superposed or parallel arranged manner. The OSD 240 transmits the synthesized data as analog signals to the display 320 of the output device 300. And, the OSD 240 outputs the video data, the data-broadcasting data and the EPG data separately as analog signals to the display 320.

The storing/reproducing processor 250 is connected to the HDD 270, the CPU 290 and the like. The storing/reproducing processor 250 retrieves the partial TS from the Demux 220 to store the partial TS in the HDD 270. The storing/reproducing processor 250 also retrieves the partial TS stored in the HDD 270 to output the partial TS to the HSI 212 and the Demux 220. The storing/reproducing processor 250 includes a storing unit 251 and a reproducing unit 252.

The storing unit 251 stores the partial TS from the Demux 220 in the HDD 270. The storing unit 251 has a buffer 251A, a storing processor 251B and the like. The buffer 251A temporarily stores the partial TS from the Demux 220. The storing processor 251B retrieves the partial TS from the Demux 220 and readably stores the partial TS in the buffer 251A under the control of the CPU 290. The storing processor 251B then reads the partial TS stored in the buffer 251A and outputs the partial TS to the HDD 270.

The reproducing unit 252 outputs the partial TS stored in the HDD 270 to the HSI 212 and the Demux 220. The reproducing unit 252 has a buffer 252A, a reproducing processor 252B and the like. The buffer 252A temporarily stores the partial TS from the HDD 270. The reproducing processor 252B retrieves the partial TS from the HDD 270 and readably stores the partial TS in the buffer 252A under the control of the CPU 290. The reproducing processor 252B reads the partial TS stored in the buffer 252A and outputs the partial TS to the HSI 212 and the Demux 220.

The input unit 260 is connected to the CPU 290 and the like. The input unit 260 has various operation buttons and knobs (both not shown) disposed on, for instance, a front surface of a casing (not shown), which are manually operable. By inputting with the operation buttons and knobs, for instance, operations of the storing/reproducing device 200 can be set. In other words, details of recoding and reproducing the content and of the TS to be received by the NIM 212 (translator's comment: correctly, 211) can be set. By the input of settings, the input unit 260 transmits various information to the CPU 290 as operation signals, so that the setting is completed. The input unit 260 may include a remote controller light receiver that receives the various information transmitted by a remote controller (not shown) via infrared light and transmits the information to the CPU 290 as operation signals.

The HDD 270 is connected to the CPU 290 and the like. The HDD 270 is controlled by an ATA (AT Attachment) interface. Here, an arrangement in which the HDD 270 is controlled by the ATA interface is described as an example, but the HDD 270 may be controlled by an IDE (Integrated Drive Electronics) interface or a SCSI (Small Computer System Interface). The HDD 270 includes a content recording area 271 in which the partial TS of the content input from the storing unit 251, namely, the content data is readably stored.

Figure 2:
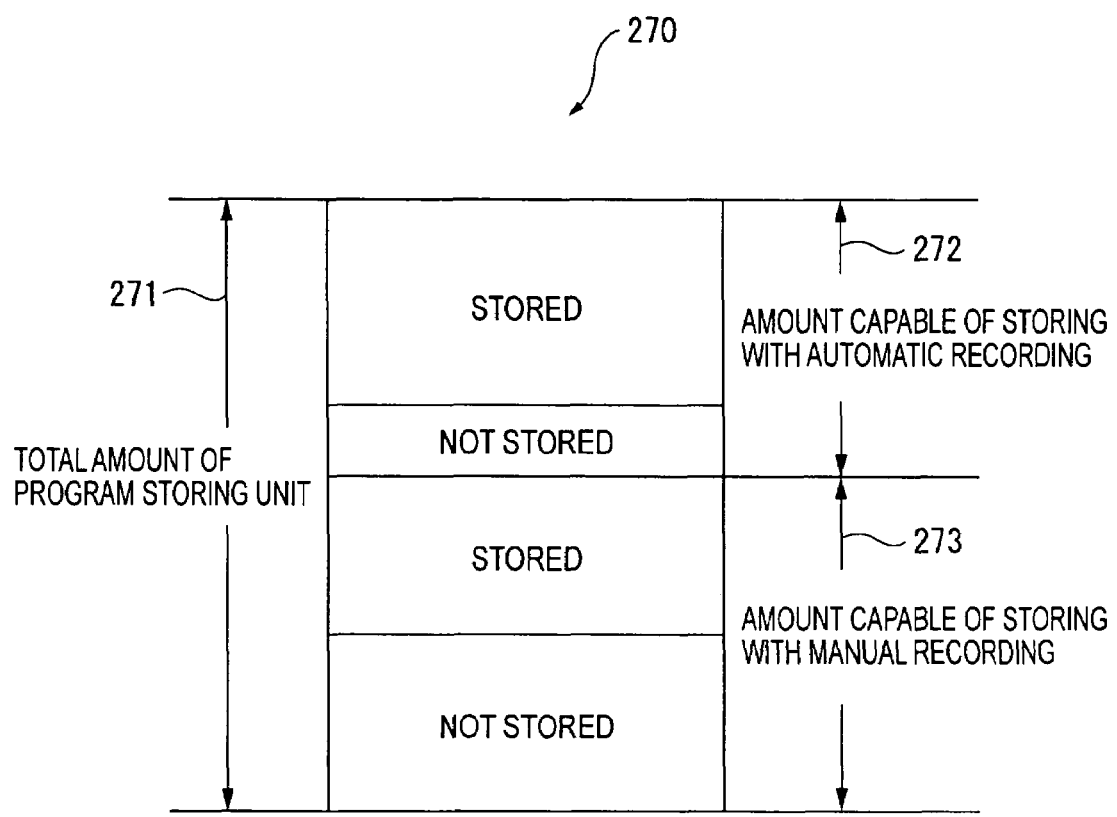
FIG. 2 is a schematic illustration showing the brief configuration of an HDD 270 of a storing/reproducing device.

As shown in FIG. 2, the content recording area 271 of the HDD 270 has an automatic recording area 272 as a related information storing area, a manual recording area 273 as a specified information storing area and the like. The manual recording area and the automatic recording area 272 are provided by dividing the content recording area 271 into two, the size occupied by each of the areas is previously set and fixed. For example, the content recording area 271 is divided into two to provide 50% for the manual recording area 273 and the other 50% for the automatic recording area 272. Note that, here is shown an example in which the manual recording area 273 and the automatic recording area 272 each occupy 50% of the content recording area 271 and the amounts thereof are fixed, however, it is not limited thereto. For instance, the amounts of the automatic recording area 272 and the manual recording area 273 may previously be set by the user's input.

The manual recording area 273 is a storing area in which the content data stored by manual input of the user or the content data programmed for timer recording. When there is no free space in the manual recording area 273 because the content data is stored, the content data is stored in the automatic recording area 272 under the control of the CPU290. Further, when there is no free space even in the automatic recording area 272, the content data stored with timer recording in the automatic recording area is erased under the control of the CPU 290, so that a free space is secured. Incidentally, the free space may be secured by erasing arbitrary content data from the content recording area by operation of the user.

The automatic recording area 272 is a recording area in which the content is programmed for timer recording by a processing of the CPU290. When there is no space in the automatic recording area 272, the content may no longer be recorded with the automatic recording by the CPU 290. In this case, the content can be recorded if the content recorded in the automatic recording area is erased to secure the free space. The erase of the content may be executed by automatically erasing the content of which the latest update date and time is the oldest under the control of the CPU 290, or by manually erasing the arbitrary content by operation of the user. As an alternative for the HDD 270, a drive or a driver that can store the various information readably in a recording medium such as a DVD (Digital Versatile Disc), an optical disc or a memory card, or a configuration combining such drive or driver may be used.

Figure 3:
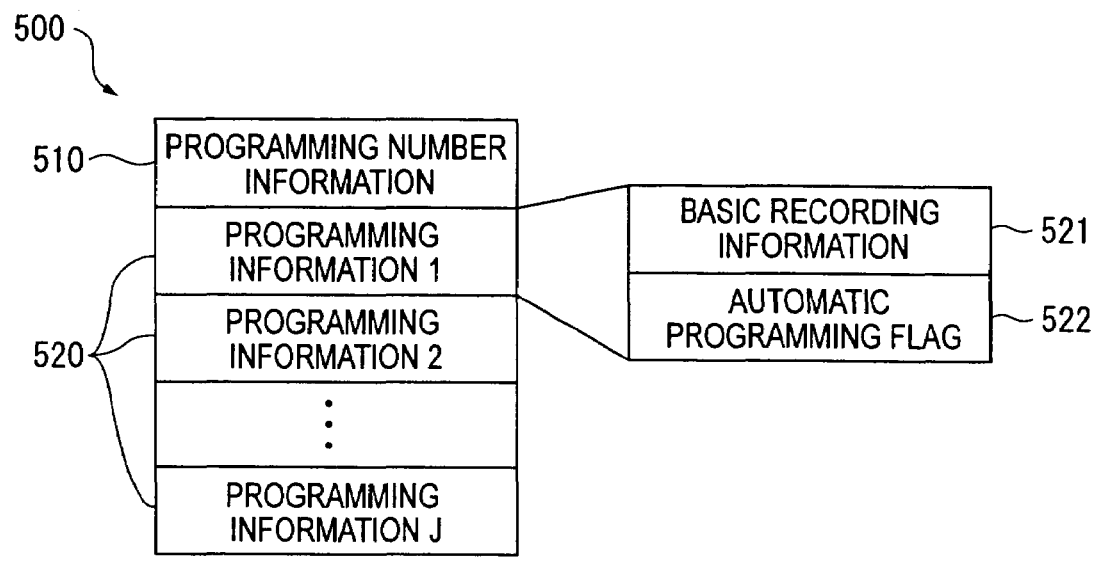
FIG. 3 is a schematic illustration showing the brief configuration of a timer recording list.
Figure 4:
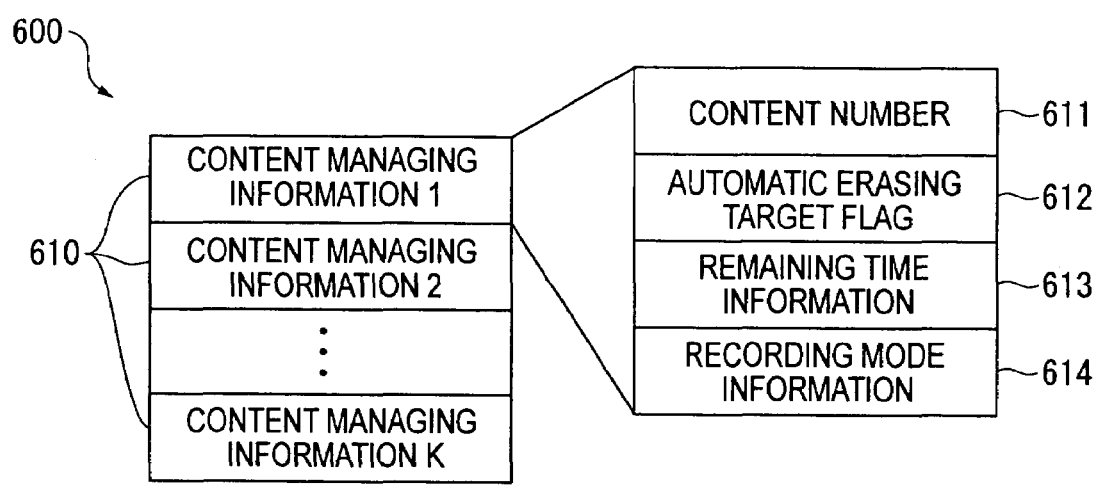
FIG. 4 is a schematic illustration showing the brief configuration of a content managing list.

The memory 280 readably stores the various data necessary for retrieving and storing the desired content data from the TS output by the NIM 211 or for reproducing the stored content data. In addition, the memory 280 readably stores, for instance, the latest EPG data retrieved by the NIM 211. Further the memory 280 readably stores a recording programming list information 500 as shown in FIG. 3, a content managing list information 600 as shown in FIG. 4, and a keyword storing area.

The recording programming list information 500 is information about a list of manual timer recording and automatic timer recording. The recording programming list information 500 has a data structure in which programming number information 510, at least one programming information 520 and the like are associated.

The programming number information 510 is information about the total number of the programming information 520. The programming number information 510 is added by one when newly setting manual recording programming or automatic recording programming with the CPU 290 and is subtracted by one when completing the recording with the manual recording programming or the automatic recording programming.

The programming information 520 is information related to the manual recording programming and the automatic recording programming. The programming information 520 is added to the recording programming list information 500 when newly setting the manual recording programming or automatic recording programming with the CPU 290 and is erased from the recording programming list information 500 when completing the recording with the manual recording programming or automatic recording programming. The programming information 520 has a data structure in which basic recording information 521, an automatic programming flag 522 and the like are associated.

The basic recording information 521 contains various information required for manual timer recording and automatic timer recording. Specifically, the basic recording information 521 has a data structure in which recording start date and time, recording end date and time, a channel number and the like are associated. The basic recording information 521 is appropriately changed by the CPU 290.

The automatic programming flag 522 is flag information showing whether the recording based on the basic recording information 521 is the automatic timer recording or not. Concretely, when the automatic programming flag 522 indicates "0", the recording processing is not the automatic timer recording (translator's comment: correctly, the automatic recording programming) but the manual recording programming, and when the automatic programming flag 522 indicates "1", the recording processing is the automatic-recording programming.

The content managing list information 600 is information about a list of information corresponding to the content stored in the HDD 270. The content managing list information 600 has a data structure in which at least one content managing information 610 is associated.

Under the control of the CPU 290, the content managing information 610 is added to the content managing list information 600 when the content is stored in the HDD 270 and is erased from the content managing list information 600 when the content is erased from the HDD 270. The content managing information 610 has a data structure in which a content number 611, an automatic erasing target flag 612 as data attribute information, a remaining time information 613, a recording mode information 614 and the like are associated. Alternatively, the content managing information 610 may have a data structure in which the content number 611 and the automatic erasing target flag 612 are associated.

The content number 611 is information about a number uniquely assigned to the content stored in the HDD 270. As an alternative for the content number 611, information such as a title uniquely assigned to the content may be used.

The automatic erasing target flag 612 is flag information showing whether or not the content identified by the content number 611 is a subject to be erased by the CPU 290 automatically. Specifically, when the automatic erasing target flag 612 indicates "0", the content is not the subject to be erased automatically, and when the automatic erasing target flag 612 indicates "1", the content is the subject to be erased automatically. The automatic erasing target flag 612 is reconfigured by the CPU 290.

The remaining time information 613 is information about a remaining time until the content identified by the content number 611 is erased automatically. The remaining time information 613 is changed by the CPU 290.

The recording mode information 614 is information indicating whether the content identified by the content number 611 is the content recorded by timer recording or the content manually recorded. In the case of the content recorded by the timer recording, the recording mode information 614 indicates whether the content is the content recorded with the automatic recording programming or the content recorded with the manual recording programming. For instance, when the recording mode information 614 indicates "00", which represents the content manually recorded, when indicates "01", which represents the content recorded with the automatic recording programming, and when indicates "11", which represents the content recorded with the manual recording programming.

The keyword storing area readably stores a keyword input by the user.

The memory 280 readably stores various programs and the like that are run on an OS (Operating System) for entirely controlling the storing/reproducing device 200. The memory 280 may preferable be a memory such as a CMOS (Complementary Metal-Oxide Semiconductor), of which storage can be retained even if the power is suddenly shut down due to, for instance, a blackout. Also, the memory 280 may include a drive or a driver that can readably store the data in a recording medium such as an HD, DVD and optical disc.

Figure 5:
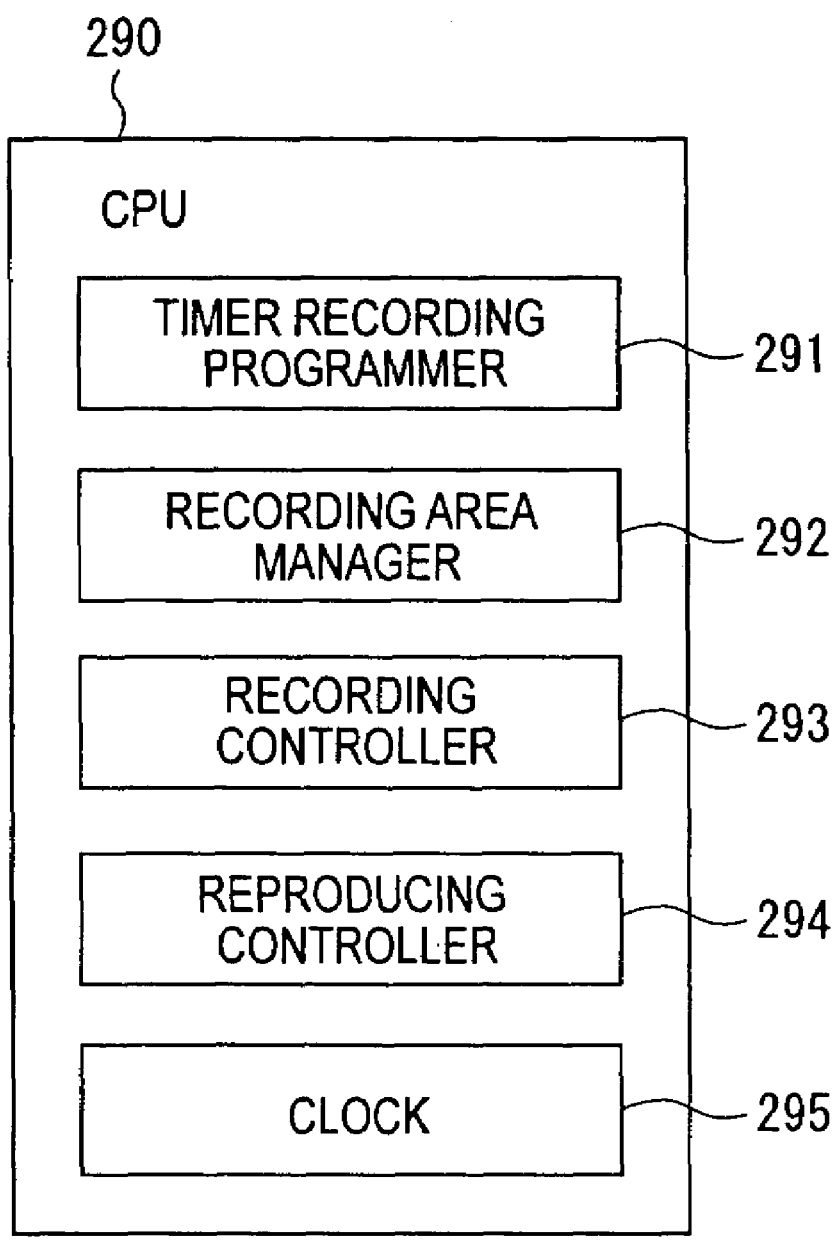
FIG. 5 is a schematic illustration showing the brief configuration of a CPU of the storing/reproducing device.

As shown in FIG. 5, the CPU 290 controls a timer recording programmer 291 (a request information recognizer), a recording area manager 292 (a storing area partitioning and a free space recognizer), a recording controller 293 (an information amount recognizer, a judging section and a storing controller), a reproducing controller 294 and a clock 295 as the various programs.

The timer recording programmer 291 recognizes the EPG and reads the keyword stored in the keyword storing area. And the timer recording programmer 291 searches the EPG for retrieving program information that contains the keyword, generates the programming information 520 based on the retrieved program information, and stores the generated information in the recording programming list information 500.

The recording area manager 292 manages the content recording area 271 and divides the content recording area 271 to form the automatic recording area 272 and the manual recording area 273. Also, the recording area manager 292 recognizes the free spaces of the automatic recording area 272 and the manual recording area 273.

The recording controller 293 controls the communication unit 210, the Demux 220, the storing unit 251 and the like such that the partial TS of the content of the desired broadcasting program is readably stored in the HDD 270. Concretely, the recording controller 293, based on the operation signal input from the input unit 260, inputs in the storing unit 251 information for requesting that the partial TS of the desired content is stored in the content recording area 271. Also, the recording controller 293 recognizes the free space of the manual recording area 273 detected by the recording area manager 292. When there is free space in the manual recording area 273, the recording controller 293 inputs information to the storing unit 251, the information requesting to record the content in the manual recording area 273. On the other hand, when there is not sufficient free space for recording the content in the manual recording area 273, the recording controller 293 recognizes the free space of the automatic recording area 272 detected by the recording area recognizer. When there is free space in the automatic recording area 272, the recording controller 293 inputs information to the storing unit 251, the information requesting to store the content in the automatic recording area 272. When there is not sufficient free space even in the automatic recording area 272 for recording the content, the recording controller 293 will not record the content.

The recording controller 293 recognizes the programming information 520 of the recording programming list information 500, and current time information acquired by a clock (described later). When recognizing that the automatic programming flag 522 of the programming information 520 contains the information indicating the automatic recording programming, the recording controller 293 inputs information to the storing unit 251, the information requesting to store the partial TS of the content stored in the programming information 520 in the automatic recording area 272. At this time, the recording controller 293 compares the free space of the automatic recording area 272 recognized by the recording area manager 292 with the data size of the content. When there is sufficient free space in the automatic recording area 272 for recording the content, the recording controller 293 inputs information to the storing unit 251, the information requesting to store the content in the automatic recording area 272.

When there is not sufficient free space in the automatic recording area 272 for recording the content, the recording controller 293 will not record the content.

On the other hand, when recognizing that the automatic programming flag 522 of the programming information 520 contains the information indicating the manual recording programming, the recording controller 293 inputs information to the storing unit 251, the information requesting to store the partial TS of the content stored in the programming information 520 in the content recording area 271. At this time, the recording controller 293 compares the free space of the manual recording area 273 recognized by the recording area manager 292 with the data size of the content to be recorded.

When there is sufficient free space in the manual recording area 273 for recording the content, the recording controller 293 inputs information to the storing unit 251, the information requesting to store the content in the manual recording area 273. On the other hand, when there is not sufficient free space in the manual recording area 273 for recording the content, the recording controller 293 compares the free space of the automatic recording area 272 with the data size of the content. When there is sufficient free space in the automatic recording area 272 for recording the content, the recording controller 293 inputs information to the storing unit 251, the information requesting to store the content in the automatic recording area 272. When there is not sufficient free space even in the automatic recording area 272 for recording the content, the recording controller 293 will not record the content.

When there is no free space in the automatic recording area 272 for recording the content, or in both of the manual recording area 273 and the automatic recording area 272 for recording the content, the recording controller 293 will not record the content as described above, however, it is not limited thereto. For example, under the control of the CPU 290, the free space of the automatic recording area 272 may be secured by erasing the content of which the latest update date and time is the oldest in order to record the content. Or, the output device 30 (translator's comment: correctly, 300) can provide guidance on that there is no free space in the content recording area 271.

The reproducing controller 296 controls the Demux 220, the decoder 230, the reproducing unit 252 and the like to output the desired content data to the output device 300.

The clock 25G (translator's comment: correctly, 295) recognizes the current time based on a reference pulse such as an internal clock.

[Operation of Storing/Reproducing System]

Next, the operation of the storing/reproducing system 100 will be explained based on FIGS. 6 and 7.

(Manual Recording)

The manual recording of the storing/reproducing system 100 will be described according to FIG. 6.

Figure 6:
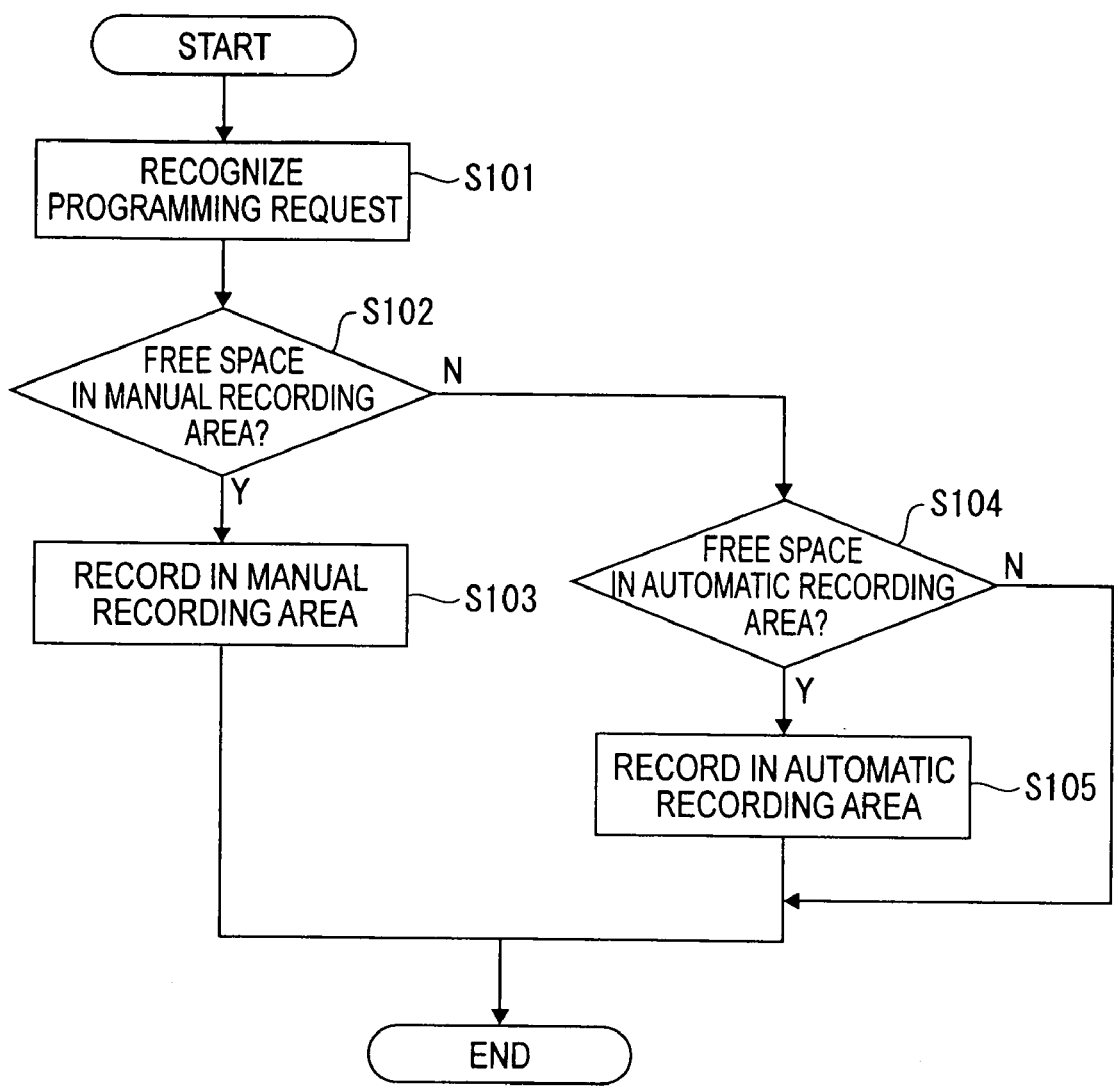
FIG. 6 is a flowchart of a manual recording of the recording/reproducing system.

In FIG. 6, the storing/reproducing device 200 of the storing/reproducing system 100 recognizes the information that requests recording of the content input by the user (step S101). Specifically, the storing/reproducing device 200 recognizes the input with the input unit 260 such as a remote controller, a keyboard, a button or the like. The information input by the user may include channel information for specifying broadcasting frequency of a broadcasting station, information related to end time, and information related to recording time information.

After step S101, the CPU 290 controls the recording area manager 292 to recognize the free space of the manual recording area 273 of the content recording area 271 (step S102). In step S102, when there is free space in the manual recording area 273, the recording controller 293 of the CPU 290 records the content in the manual recording area 273.

On the other hand, in step S102, when there is no free space in the manual recording area 273, the CPU 290 controls the recording area manager 292 to detect and recognize the free space of the automatic recording area 272 (step S104). In step S104, when there is free space in the automatic recording area 272, the recording controller 293 records the content in the free space of the automatic recording area 272 (step S105). Then the recording controller 293 again recognizes the recording area of the manual recording content manually input and recorded in the automatic recording area 272, as the manual recording area 273. In other words, the amount of the recording area of the manual recording area 273 is increased, and the amount of the automatic recording area 272 is decreased.

When there is no free space even in the automatic recording area 272, the manual recording is terminated. At this time, the output device 300 can provide guidance on that there is no free space in the content recording area 271.

In a case that the free space of the manual recording area 273 is used up while the content is being recorded in the manual recording area 273, the recording controller 293 may perform steps S104 and S105. In this case, a part of the content is stored in the automatic recording area 272. Alternatively, when the free space is used up while the content is being recorded in the manual recording area 273, the recording controller 293 may stop recording for the rest of the content.

(Automatic Recording)

Figure 7:
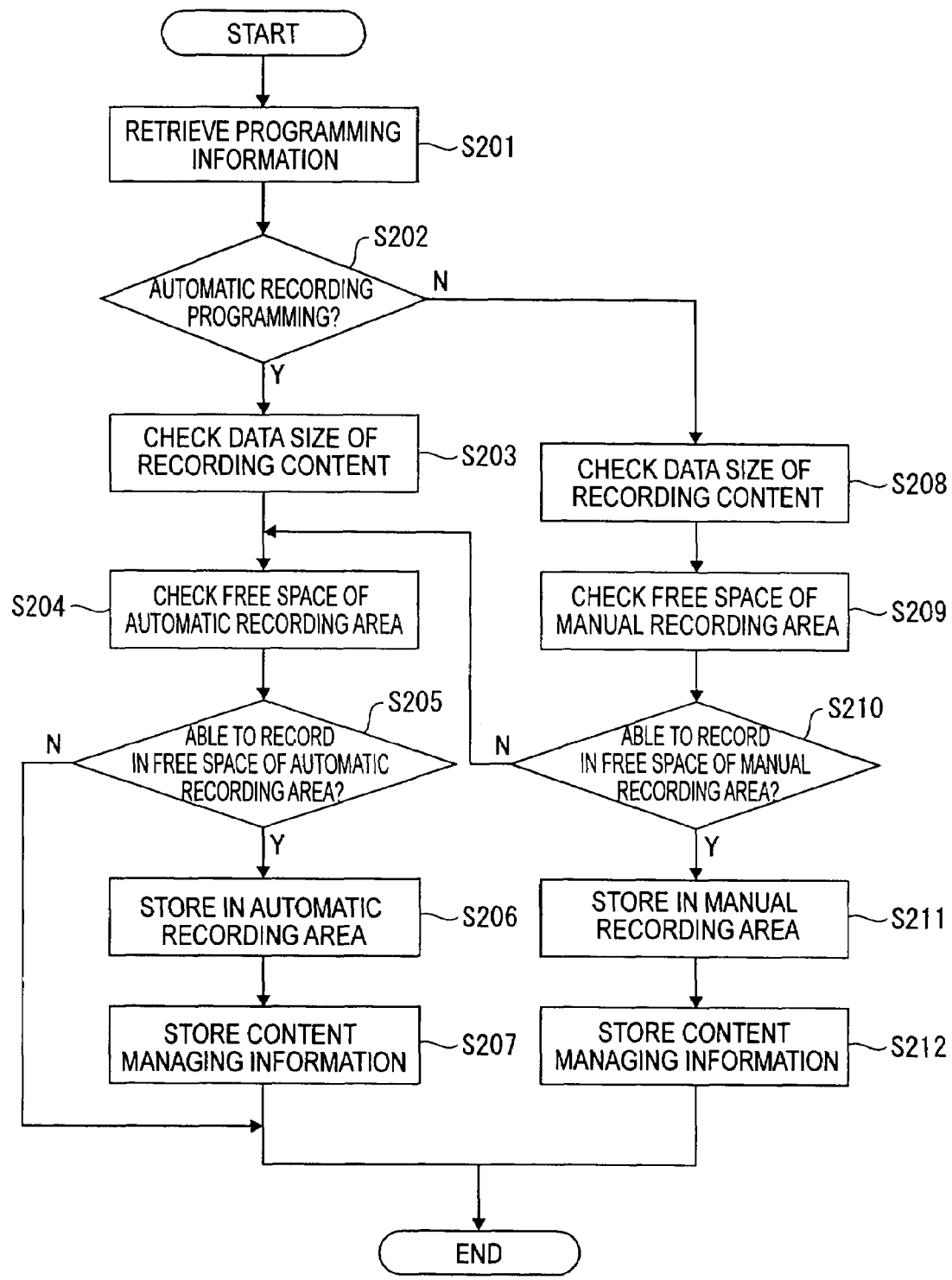
FIG. 7 is a flowchart of an automatic recording of the recording/reproducing system.

Next, the automatic recording of the storing/reproducing system 100, i.e., recording based on the recording programming list information 500 is described according to FIG. 7.

In FIG. 7, the recording controller 293 reads out the recording programming list information 500 and recognizes programming information 520 of which the recording start time is the earliest in the recording programming list information 500 (step S201). According to the automatic programming flag 522 of the programming information 520, the recording controller 293 judges that the programming information 520 is whether the manual recording programming input by the user or the automatic recording programming in which the program information based on the keyword is retrieved from the EPG with the timer recording programmer 291 (step S202). Specifically, the recording controller 293 judges the programming information 520 as the manual recording programming when "0" is input in the automatic programming flag 522, and judges the programming information 520 as the automatic recording programming when "1" is input in the automatic programming flag 522.

In step S202, when the programming information 520 is judged as the automatic recording programming, the recording controller 293 recognizes the data size of the content to be recorded (step S203). As for recognizing the data size of the content, the data size of the content is previously acquired from the program information of the EPG by the timer recording programmer 291 and the acquired data size is stored in the basic recording information 521 when the programming information 520 is generated. Accordingly, the recording controller 293 can easily recognize the data size of the content by referring to the programming information 520. Or, the recording controller 293 can calculate rough data size based on the broadcasting time of the content to be recorded.

Next, the recording controller 293 recognizes the free space of the automatic recording area 272 recognized by the recording area manager 292 (step S204). The recording controller 293 then compares the data size of the content recognized in step S203 with the free space of the automatic recording area 272 recognized in step S204, and judges whether or not the content can be recorded in the free space of the automatic recording area 272 (step S205). Here, the content can be recorded in the automatic recording area 272 when the data size of the content is smaller than the free space of the automatic recording area, but cannot be recorded when the data size of the content is larger than the free space of the automatic recording area 272. Here, the recording controller 293 terminates the automatic recording when judging that there is not sufficient free space in the automatic recording area 272 for recording the content.

On the other hand, in step S205, when recognizing that there is sufficient free space in the automatic recording area 272 for storing the content, the recording controller 293 records the content in the free space of the automatic recording area 272 by controlling the storing unit 251 (step S206). Then, the recording controller 293 gives the content number to the recorded content for identifying the content, and generates the content managing information 610 (step S207).

In step S202, when the programming information 520 is judged as the manual recording programming input by the user, the recording controller 293 recognizes the data size of the content to be recorded (step S208). As for recognizing the data size of the content, the recording controller 293 calculates rough data size based on the broadcasting time of the content to be recorded.

Next, the recording controller 293 recognizes the free space of the manual recording area 273 recognized by the recording area recognizer 282 (step S209). The recording controller 293 then compares the data size of the content recognized in step S208 with the free space of the manual recording area 273 recognized in step S209, and judges whether or not the content can be recorded in the free space of the manual recording area 273 (step S210). When judging that there is not sufficient free space in the manual recording area 273 for recording the content, the recording controller 293 performs steps S204 through S207, so that the content is recorded in the automatic recording area 272. Then the recording controller 293 newly recognizes the recording area of the recording content based on the programming information 520 manually input and recorded in the automatic recording area 272 as the manual recording area 273. In other words, the amount of the recording area of the manual recording area 273 is increased, and the amount of the automatic recording area 272 is decreased.

On the other hand, in step S210, when the recording area manager 292 judges that there is sufficient free space in the manual recording area 273 for storing the content, the recording controller 293 records the content in the free space of the manual recording area 273 by controlling the storing unit 251 (step S211). Then, the recording controller 293 gives the content number to the stored content for identifying the content, and generates the content managing information 610 (step S212).

[Advantages of Storing/Reproducing System]

The above-described storing/reproducing system 100 recognizes the programming information 520 read out from the recording programming list information 500 and the data size of the content corresponding to the programming information 520 with the recording controller 293, and compares the free spaces of the automatic recording area 272 and the manual recording area 273 recognized by the recording area manager 292 with the data size. The content corresponding to the programming information 520 is recorded in the automatic recording area 272, when the programming information 520 is the information input by the user, and when it is judged that the content based on the programming information 520 cannot be recorded in the manual recording area 273. On the other hand, the recording controller 293 controls the storing unit 251 not to record the content corresponding to the programming information 520, when the programming information is the information set by the CPU 290 based on the keyword, and when the content based on the programming information 520 cannot be recorded in the automatic recording area.

Therefore, even if many pieces of the programming information 520 based on the automatic recording are stored in the recording programming list information 500, the content corresponding to the programming information 520 of the automatic recording will not be recorded in the manual recording area 273. Thus, the manual recording area 273 can be secured as the recording area for the content with manual recording.

When recording with manual recording without free space in the manual recording area 273, the content corresponding to the manual recording is recorded in the automatic recording area 272. Therefore, even when the free space of the manual recording area 273 is used up, the content can be recorded in the automatic recording area 272 if there is free space corresponding to the programming information 520 with the manual recording. Accordingly the storing/reproducing system 100 can store the content appropriately and effectively in the content recording area 271.

The recording controller 293 newly recognizes the recording area of the manual recording content manually input and recorded in the automatic recording area 272 or of the recording content based on the programming information 520 manually input, as the manual recording area 273, so that the amount of the recording area of the manual recording area 273 is increased and the amount of the automatic recording area is decreased. Therefore, the content with the manual recording recorded in the automatic recording area 272 is recognized as the recording by manual operation as the content recorded in the manual recording area 273. Therefore, the content recorded with the manual recording operation can be distinguished from the automatic recording with the keyword search of the CPU 290, so that the content recorded with the manual operation can be protected.

The recording controller 293 refuses recording when the both free spaces of the automatic recording area 272 and the manual recording area 273 are not sufficient. Therefore, the content once recorded is saved without being automatically erased, and the content will not be erased until the user requests erasing by input operation. Thus, since the content which has not yet been watched will not be erased, the user has much time to check the content. Additionally, the frequent accesses to the HDD 270 due to the automatic recording can be avoided, so that the HDD 270 can maintain its quality and is prevented from deteriorating.

The storing/reproducing device 200 retrieves the program information about the content of the broadcasting program owned by EPG, and records the content based on the program information. Therefore, the content can easily be recorded based on the program information of the broadcasting program desired by the user.

Modifications of Embodiment

The present invention has been described above with reference to the embodiment, the scope of the invention is not limited thereto and includes various modifications as long as an object of the present invention can be achieved.

For example, in the present embodiment, the storing/reproducing system 100 is exemplified for recording the broadcasting program, an automatic guide for traveling information or shopping information, an automatic update function of a personal computer, an automatic download function or the like can be applied.

In the present embodiment, when the free space of the manual recording area 273 is not enough, in a case of the manual recording by the input operation of the user or the manual recording based on the programming information 520 stored by the input operation of the user, the content to be recorded is recorded in the automatic recording area 272. On the other hand, the content based on the programming information 520 set according to the keyword will not be recorded when the free space of the automatic recording area 272 is not enough. However, it is not limited thereto.

For example, the recording controller 293 may increase the amount of the manual recording area 273 for recording the content based on the manual recording when judging that there is no free space in the manual recording area 273. At this time, when there is free space in the automatic recording area 272, the free space of the automatic recording area 272 may be decreased.

Further, the recording controller 293 may increase the amount of the automatic recording area 272 for recording the content based on the automatic recording when judging that there is no free space in the automatic recording area 272. At this time, by recognizing the free space of the manual recording area 273 with the recording area manager, the recording controller 293 decreases the free space of the manual recording area 273 such that the free space of the manual recording area 273 is equal to or greater than a predetermined amount. Here, the free space of the manual recording area 273 is preferably secured only by an amount sufficient for recording the content when the content is recorded by the manual recording.

Accordingly, the free space of the manual recording area 273 can be secured in the same manner as the present embodiment, and the content can be recorded corresponding to the programming information 520 with the manual recording if there is free space in the automatic recording area 272, even when there is no free space in the manual recording area 273. Therefore, the recording content desired by the user can be stored in the content recording area 271 appropriately.

Further, in the present embodiment, when the both free spaces of the automatic recording area 272 and the manual recording area 273 are not enough, the content will not be recorded. However, it is not limited thereto. For example, the recording controller can decrease the data size of the content recorded with the automatic recording in the automatic recording area when the programming information with manual recording is recognized at the time that the both free spaces of the automatic recording area 272 and the manual recording area 273 are not enough. In this case, the data size can be decreased by changing a storing state of the content, for example, by deteriorating image quality or sound quality of the content which has already been recorded. By changing the storing state of the content, the data size can easily be decreased, thereby securing the free space. The data size may be reduced by compressing the stored content. In this case, the data size is decreased by compressing the image quality or the sound quality, and the content can be reproduced without deteriorating the storing state such as the image quality or the sound quality by decompressing the image quality or the sound quality.

Further, the free space is not yet enough even though the data size of the content is decreased in the above-described manner, the content or a part of it stored in the automatic recording area 272 may be erased. The free space can be effectively secured by erasing the content.

Incidentally, when the data size is decreased by changing the recording state of the content recorded in the automatic recording area 272 or when the content is erased, it is preferable to set priority information in the content managing information of each content, so that the data size of the content is decreased or the content is erased based on the priority information. In this case, the priority information may be set based on the latest update date of the content, or based on statistics in which preference of the user is statistically managed. Since the data size of the content is changed and the content is erased based on the priority information, the content can effectively be organized, thereby securing the free space.

When the both free spaces of the automatic recording area 272 and the manual recording area 273 are not enough, the content to be recorded can be recorded in the content storing area with the data being compressed. Accordingly, because the content can be recorded with the data size being small, the content can be recorded in the small free space.

In the present embodiment, the content is recorded in the automatic recording area 272 when the data size of the content with the automatic recording programming is compared with the free space of the automatic recording area 272 and it is judged that the content can be recorded in the automatic recording area 272, however, it is not limited thereto. For example, even when the data size of the content is greater than the free space of the automatic recording area 272, the content may be recorded in the automatic recording area 272. In this case, the content is recorded until the free space of the automatic recording area 272 is used up, and recording of the content is terminated when the free space is run out. Owing to this, the free space of the automatic recording area can effectively be used.

In the present embodiment, even for recording the content with the manual recording programming, the content is recorded in the manual recording area 273 when the data size of the content is compared with the free space of the manual recording area 273 and it is judged that the content can be recorded in the manual recording area 273, however, it is not limited thereto. For example, even when the data size of the content is greater than the free space of the manual recording area 273, the content may be recorded in the manual recording area 273. In such case, if there is free space in the automatic recording area 272, the rest of the content may be recorded in the automatic recording area 272. Accordingly, the content storing area can further effectively be used.

Specific structures and procedures of embodiment of the present invention can be also changed as long as an object of the present invention can be achieved.

Advantages of Embodiment

The storing/reproducing device 200 recognizes the programming information 520 read out from the recording programming list information 500 and the data size of the content corresponding to the programming information 520 with the recording controller 293, and compares the free spaces of the automatic recording area 272 and the manual recording area 273 recognized by the recording area manager 292 with the data size. The content corresponding to the programming information 520 is recorded in the automatic recording area 272, when the programming information 520 is the information input by the user, and when it is judged that the content based on the programming information 520 cannot be recorded in the manual recording area 273. On the other hand, the recording controller 293 controls the storing unit 251 not to record the content corresponding to the programming information 520, when the programming information 520 is the information set by the CPU 290 based on the keyword, and when the content based on the programming information 520 cannot be recorded in the automatic recording area.

Therefore, even if many pieces of the programming information 520 based on the automatic recording are stored in the recording programming list information 500, the content corresponding to the programming information 520 of the automatic recording will not be recorded in the manual recording area 273. Thus, since the manual recording area 273 can be secured, the manual recording by the input operation of the user can appropriately be performed.

The priority application No JP2004-164933 upon which this patent application is based is hereby incorporated by reference.

What is claimed is:

1. An information processor that, based on detail information related to a detail of information, controls an information retriever to retrieve the information of a predefined detail of information and a storing unit to store the information, comprising:
   a request information recognizer that recognizes request information so that the information retriever retrieves the information corresponding to a specified detail and the information related to the predefined detail and the storing unit stores the information;
   a storing area partitioning that forms a specified information storing area in which a plurality of the information corresponding to the specified detail can be stored and a related information storing area in which a plurality of the information related to the predefined detail can be stored in the storing unit;
   an information amount recognizer that recognizes an amount of the information being requested based on the detail information corresponding to the information being requested recognized from the request information with the request information recognizer;
   a free space recognizer that recognizes a free space of the specified information storing area and the related information storing area;
   a judging section that compares the amount of the information being requested with the free space and judges whether or not the information being requested can be stored; and
   a storing controller that controls the information retriever to retrieve the information being requested based on the detail information and store the information in the related information storing area when the judging section recognizes that the information cannot be stored in a case that the information being requested is the information corresponding to the specified detail, and restricts the information retriever to retrieve the information being requested when the judging section recognizes that the information cannot be stored in a case that the information being requested is the information related to the predefined detail.

2. The information processor according to claim 1, wherein the storing controller, when the judging section judges that the information cannot be stored in the case that the information being requested is the information corresponding to the specified detail, increases the specified information storing area formed by the storing area partitioning so that at least the information being requested can be stored, when the judging section judges that the information cannot be stored in the case that the information being requested is the information related to the predefined detail, increases the related information storing area while a free space of the specified information storing area formed by the storing area partitioning is equal to or greater than a predetermined amount, and then controls storing of the information.

3. The information processor according to claim 1, wherein the storing controller, when the judging section recognizes that the information being requested cannot be stored, changes a storing state of the information stored in the storing unit and increases the free space.

4. The information processor according to claim 3, wherein the storing controller, when recognizing that the information cannot be stored even when the storing state is changed after the storing state of the information stored in the related information storing area is changed, changes a storing state of the information stored in the specified information storing area.

5. The information processor according to claim 3, wherein the storing controller changes the storing state by compressing the information stored in the storing unit.

6. The information processor according to claim 3, wherein the storing controller changes the storing state by erasing at least a part of the information stored in the storing unit.

7. The information processor according to claim 3, wherein the storing controller recognizes priority information associated with the information stored in the storing unit and related to a priority of the information, and changes the storing state of the information corresponding to the priority information in the order of the ascending priorities.

8. The information processor according to claim 1, wherein the storing controller, when the judging section judges that the information being requested cannot be stored, compresses the information to be retrieved by the information retriever or controls the information retriever to retrieve the information being compressed.

9. The information processor according to claim 1, wherein
   the information is a content to be broadcasted or distributed, or a privately created sharable content, and
   the detail information is information related to at least one of a title and the detail of the content.

10. An information processor that, based on detail information related to a detail of information, controls an information retriever to retrieve the information of a predefined detail of information and a storing unit to store the information, comprising:
    a request information recognizer that recognizes request information so that the information retriever retrieves the information corresponding to a specified detail and the information related to the predefined detail and the storing unit stores the information;
    a storing area partitioning that forms a specified information storing area in which a plurality of the information corresponding to the specified detail can be stored and a related information storing area in which a plurality of the information related to the predefined detail can be stored in the storing unit;
    an information amount recognizer that recognizes an amount of the information being requested based on the detail information corresponding to the information being requested recognized from the request information with the request information recognizer; a free space recognizer that recognizes a free space of the specified information storing area and the related information storing area;

a judging section that compares the amount of the information being requested with the free space and judges whether or not the information being requested can be stored; and a storing controller that, when the judging section judges that the information cannot be stored in a case that the information being requested is the information corresponding to the specified detail, increases the specified information storing area formed by the storing area partitioning so that at least the information being requested can be stored, when the judging section judges that the information cannot be stored in a case that the information being requested is the information related to the predefined detail, increases the related information storing area while a free space of the specified information storing area formed by the storing area partitioning is kept equal to or greater than a predetermined amount, and then controls storing of the information.

11. The information processor according to claim 10, wherein the storing controller controls the information retriever to retrieve the information being requested based on the detail information and store the information in the related information storing area when the judging section recognizes that the information cannot be stored in the case that the information being requested is the information corresponding to the specified detail, and restricts the information retriever to retrieve the information being requested when the judging section recognizes that the information cannot be stored in the case that the information being requested is the information related to the predefined detail.

12. The information processor according to claim 10, wherein the storing controller, when the judging section recognizes that the information being requested cannot be stored, changes a storing state of the information stored in the storing unit and increases the free space.

13. The information processor according to claim 12, wherein the storing controller, when recognizing that the information cannot be stored even when the storing state is changed after the storing state of the information stored in the related information storing area is changed, changes a storing state of the information stored in the specified information storing area.

14. The information processor according to claim 12, wherein the storing controller changes the storing state by compressing the information stored in the storing unit.

15. The information processor according to claim 12, wherein the storing controller changes the storing state by erasing at least a part of the information stored in the storing unit.

16. The information processor according to claim 10, wherein the storing controller, when the judging section judges that the information being requested cannot be stored, compresses the information to be retrieved by the information retriever or controls the information retriever to retrieve the information being compressed.

17. The information processor according to claim 10, wherein
the information is a content to be broadcasted or distributed, or a privately created sharable content, and
the detail information is information related to at least one of a title and the detail of the content.

18. An information storage, comprising:
an information retriever that retrieves information;
a storing unit that stores the retrieved information; and
an information processor that, based on detail information related to a detail of the information, controls the information retriever to retrieve the information of a predefined detail of information and the storing unit to store the information,
the information processor including:
a request information recognizer that recognizes request information so that the information retriever retrieves the information corresponding to a specified detail and the information related to the predefined detail and the storing unit stores the information;
a storing area partitioning that forms a specified information storing area in which a plurality of the information corresponding to the specified detail can be stored and a related information storing area in which a plurality of the information related to the predefined detail can be stored in the storing unit;
an information amount recognizer that recognizes an amount of the information being requested based on the detail information corresponding to the information being requested recognized from the request information with the request information recognizer;
a free space recognizer that recognizes a free space of the specified information storing area and the related information storing area;
a judging section that compares the amount of the information being requested with the free space and judges whether or not the information being requested can be stored; and
a storing controller that controls the information retriever to retrieve the information being requested based on the detail information and store the information in the related information storing area when the judging section recognizes that the information cannot be stored in a case that the information being requested is the information corresponding to the specified detail, and restricts the information retriever to retrieve the information being requested when the judging section recognizes that the information cannot be stored in a case that the information being requested is the information related to the predefined detail.

19. An information storage, comprising:
an information retriever that retrieves information;
a storing unit that stores the retrieved information; and
an information processor that, based on detail information related to a detail of the information, controls the information retriever to retrieve the information of a predefined detail of information and the storing unit to store the information,
the information processor including:
a request information recognizer that recognizes request information so that the information retriever retrieves the information corresponding to a specified detail and the information related to the predefined detail and the storing unit stores the information;
a storing area partitioning that forms a specified information storing area in which a plurality of the information corresponding to the specified detail can be stored and a related information storing area in which a plurality of the information related to the predefined detail can be stored in the storing unit;
an information amount recognizer that recognizes an amount of the information being requested based on the detail information corresponding to the information being requested recognized from the request information with the request information recognizer;
a free space recognizer that recognizes a free space of the specified information storing area and the related information storing area;

adjudging section that compares the amount of the information being requested with the free space and judges whether or not the information being requested can be stored; and a storing controller that, when the judging section judges that the information cannot be stored in a case that the information being requested is the information corresponding to the specified detail, increases the specified information storing area formed by the storing area partitioning so that at least the information being requested can be stored, when the judging section judges that the information cannot be stored in a case that the information being requested is the information related to the predefined detail, increases the related information storing area while a free space of the specified information storing area formed by the storing area partitioning is equal to or greater than a predetermined amount, and then controls storing of the information.

20. An information processing method for storing information in a storing unit with a computing unit, the method executed by the computing unit comprising the steps of:

recognizing request information to retrieve the information corresponding to a specified detail and the information related to the predefined detail and store the information with the storing unit;

recognizing an amount of the information being requested based on the detail information corresponding to the information being requested recognized from the request information;

recognizing free spaces of a specified information storing area in which a plurality of the information corresponding to the specified detail can be stored and a related information storing area in which a plurality of the information related to the predefined detail can be stored, the specified information storing area and the related information storing area being formed in the storing unit;

comparing the recognized amount of the information being requested with the free space and judging whether or not the information being requested can be stored; and retrieving the information being requested based on the detail information and storing the information in the related information storing area when recognizing that the information cannot be stored in the specified information storing area in a case that the information being requested is the information corresponding to the specified detail, and restricting retrieving of the information being requested when recognizing that the information cannot be stored in the related information storing area in a case that the information being requested is the information related to the predefined detail.

21. An information processing method for storing information in a storing unit with a computing unit, the method executed by the computing unit comprising the steps of:

recognizing request information to retrieve the information corresponding to a specified detail and the information related to the predefined detail and store the information with the storing unit;

recognizing an amount of the information being requested based on the detail information corresponding to the information being requested recognized from the request information;

recognizing free spaces of a specified information storing area in which a plurality of the information corresponding to the specified detail can be stored and a related information storing area in which a plurality of the information related to the predefined detail can be stored, the specified information storing area and the related information storing area being formed in the storing unit;

comparing the recognized amount of the information being requested with the free space and judging whether or not the information being requested can be stored; and when judging that the information cannot be stored in the specified information storing area in a case that the information being requested is the information corresponding to the specified detail, increasing the specified information storing area so that at least the information being requested can be stored, when judging that the information cannot be stored in the related information storing area in a case that the information being requested is the information related to the predefined detail, increasing the related information storing area while a free space of the specified information storing area is kept equal to or greater than a predetermined amount, and then controlling storing of the information.

22. A recording medium storing an information processing program in a manner readable by a computing unit for controlling the computing unit so that the computing unit functions as an information processor that, based on detail information related to a detail of information, controls an information retriever to retrieve the information of a predefined detail of information and a storing unit to store the information, the information processor including:

a request information recognizer that recognizes request information so that the information retriever retrieves the information corresponding to a specified detail and the information related to the predefined detail and the storing unit stores the information;

a storing area partitioning that forms a specified information storing area in which a plurality of the information corresponding to the specified detail can be stored and a related information storing area in which a plurality of the information related to the predefined detail can be stored in the storing unit;

an information amount recognizer that recognizes an amount of the information being requested based on the detail information corresponding to the information being requested recognized from the request information with the request information recognizer;

a free space recognizer that recognizes a free space of the specified information storing area and the related information storing area;

adjudging section that compares the amount of the information being requested with the free space and judges whether or not the information being requested can be stored; and a storing controller that controls the information retriever to retrieve the information being requested based on the detail information and store the information in the related information storing area when the judging section recognizes that the information cannot be stored in a case that the information being requested is the information corresponding to the specified detail, and restricts the information retriever to retrieve the information being requested when the judging section recognizes that the information cannot be stored in a case that the information being requested is the information related to the predefined detail.

23. A recording medium storing an information processing program in a manner readable by a computing unit for controlling the computing unit so that the computing unit functions as an information processor that, based on detail information related to a detail of information, controls an information retriever to retrieve the information of a predefined detail of information and a storing unit to store the information, the information processor including:

a request information recognizer that recognizes request information so that the information retriever retrieves the information corresponding to a specified detail and the information related to the predefined detail and the storing unit stores the information;

a storing area partitioning that forms a specified information storing area in which a plurality of the information corresponding to the specified detail can be stored and a related information storing area in which a plurality of the information related to the predefined detail can be stored in the storing unit;

an information amount recognizer that recognizes an amount of the information being requested based on the detail information corresponding to the information being requested recognized from the request information with the request information recognizer;

a free space recognizer that recognizes a free space of the specified information storing area and the related information storing area;

a judging section that compares the amount of the information being requested with the free space and judges whether or not the information being requested can be stored; and a storing controller that, when the judging section judges that the information cannot be stored in a case that the information being requested is the information corresponding to the specified detail, increases the specified information storing area formed by the storing area partitioning so that at least the information being requested can be stored, when the judging section judges that the information cannot be stored in a case that the information being requested is the information related to the predefined detail, increases the related information storing area while a free space of the specified information storing area formed by the storing area partitioning is kept equal to or greater than a predetermined amount, and then controls storing of the information.

24. A recording medium storing an information processing program in a manner readable by a computing unit for controlling the computing unit to execute instructions so that a storing unit stores information, the instructions including the steps of:

recognizing request information to retrieve the information corresponding to a specified detail and the information related to the predefined detail and store the information with the storing unit;

recognizing an amount of the information being requested based on the detail information corresponding to the information being requested recognized from the request information;

recognizing free spaces of a specified information storing area in which a plurality of the information corresponding to the specified detail can be stored and a related information storing area in which a plurality of the information related to the predefined detail can be stored, the specified information storing area and the related information storing area being formed in the storing unit;

comparing the recognized amount of the information being requested with the free space and judging whether or not the information being requested can be stored; and retrieving the information being requested based on the detail information and storing the information in the related information storing area when recognizing that the information cannot be stored in the specified information storing area in a case that the information being requested is the information corresponding to the specified detail, and restricting retrieving of the information being requested when recognizing that the information cannot be stored in the related information storing area in a case that the information being requested is the information related to the predefined detail.

25. A recording medium storing an information processing program in a manner readable by a computing unit for controlling the computing unit to execute instructions so that a storing unit stores information, the instructions including the steps of:

recognizing request information to retrieve the information corresponding to a specified detail and the information related to the predefined detail and store the information with the storing unit;

recognizing an amount of the information being requested based on the detail information corresponding to the information being requested recognized from the request information;

recognizing free spaces of a specified information storing area in which a plurality of the information corresponding to the specified detail can be stored and a related information storing area in which a plurality of the information related to the predefined detail can be stored, the specified information storing area and the related information storing area being formed in the storing unit;

comparing the recognized amount of the information being requested with the free space and judging whether or not the information being requested can be stored; and when judging that the information cannot be stored in the specified information storing area in a case that the information being requested is the information corresponding to the specified detail, increasing the specified information storing area so that at least the information being requested can be stored, when judging that the information cannot be stored in the related information storing area in a case that the information being requested is the information related to the predefined detail, increasing the related information storing area while a free space of the specified information storing area is kept equal to or greater than a predetermined amount, and then controlling storing of the information.

* * * * *